F. GINKEL.
FERTILIZER DISTRIBUTER.
APPLICATION FILED OCT. 20, 1910. RENEWED JUNE 6, 1918.
1,325,287.
Patented Dec. 16, 1919.
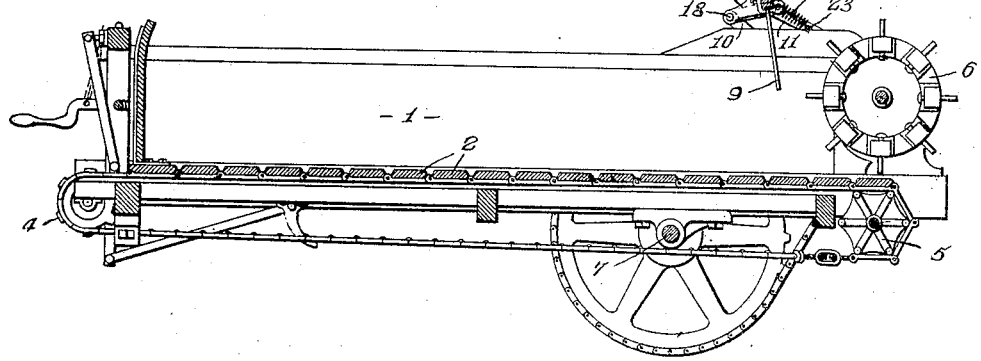
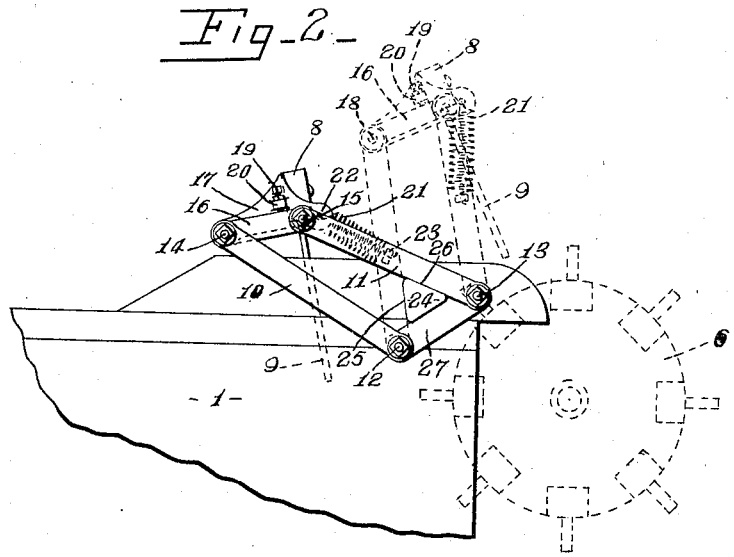
WITNESSES:
INVENTOR
Fred Ginkel
BY
ATTORNEYS

UNITED STATES PATENT OFFICE.

FRED GINKEL, OF SYRACUSE, NEW YORK, ASSIGNOR, BY MESNE ASSIGNMENTS, TO DEERE & COMPANY, OF MOLINE, ILLINOIS, A CORPORATION OF ILLINOIS.

FERTILIZER-DISTRIBUTER.

1,325,287.     Specification of Letters Patent.     Patented Dec. 16, 1919.

Application filed October 20, 1910, Serial No. 588,063. Renewed June 6, 1918. Serial No. 238,608.

*To all whom it may concern:*

Be it known that I, FRED GINKEL, of Syracuse, in the county of Onondaga and State of New York, have invented a certain new and useful Fertilizer-Distributer, of which the following is a specification.

My invention relates to fertilizer distributers and has for its object means whereby the comb may be positioned to act as an end board; and it consists in the combinations and constructions hereinafter set forth and claimed.

In describing this invention reference is had to the accompanying drawing in which like characters designate corresponding parts in all the views.

Figure 1 is a longitudinal sectional view of a fertilizer distributer embodying my invention, parts being removed.

Fig. 2 is an enlarged elevation of the rear portion of a fertilizer distributer, the beater being indicated in dotted lines, and the position of the comb when in its position to coact with the beater being indicated in dotted lines.

1 is the body or box of the fertilizer distributer; 2 is the movable bottom or apron consisting of sections carried by a chain 3 which is movable over sprocket wheels 4 and 5 located respectively at the front and the rear of the box 1; 6 is the beater. The bottom is actuated from the rear axle 7 in any well known manner and may be connected to and disconnected from its actuating means, at will, in any well known manner, as will be understood by those skilled in the art. The beater 6 is usually a rotatable beater and is actuated from the axle and its operation is controlled in synchrony with the bottom in any well known manner as will be understood by those skilled in the art. All of the foregoing parts may be of any desirable form, size, and construction.

8 is a comb or rake which is supported by freely movable holding and guiding devices arranged to normally support the rake crosswise of the body in front of the beater and yieldingly hold the same against the rear end portion of the load and movable by the pressure of the load on the comb or rake during the rearward movement of the load by the movable bottom or apron to carry the comb or rake into a position above the beater. This guiding and holding means includes a part for engaging the rake and maintaining the rake with its teeth in substantially upright position in all positions of the holding and guiding means. As here illustrated, the comb or rake 8 includes a back or cross rail and tines or fingers 9 depending therefrom, the comb being supported by suitable means by which it normally occupies a position to act as an end board as indicated in Fig. 1, and in full lines in Fig. 2, the supporting means being movable during the initial movement of the bottom to carry the comb into a position above the beater 6 to perform its ordinary functions, as indicated in dotted lines in Fig. 2. The movement of the comb from the position in which it acts as an end board to the position in which it performs its usual functions as a comb, is effected by the pressure of the load when the bottom is being actuated, and when such pressure is removed as when the load is exhausted, the comb falls by its own weight from the position shown in dotted lines, Fig. 2, to that indicated in full lines.

The supporting means comprises two pairs of links located respectively on opposite sides of the body 1 of the fertilizer distributer and connected to opposite ends of the comb, the members 10, 11 of each pair being pivoted respectively at 12, 13 to the body at fixed points spaced apart and normally extending in substantial parallelism upwardly and forwardly and being pivoted at 14, 15 to the opposite ends of a link 16 which connects their upper ends. This connecting link is pivoted to the comb 8 and as shown, the comb 8 is formed with forwardly extending brackets as 17, each bracket 17 being pivoted at 18 to one of the links 16, the pivot 18 being alined with, and usually an extension, of the pivot 14. The pivotal movement of the comb is about the single axis 18 and is limited by an adjustable shoulder as a screw 19 threading through a lug 20 on the outer face of each bracket 17, the shoulder 19 coacting with the upper edge of the link 16, thus limiting the pivotal movement of the comb in one direction. The comb is yieldingly held from movement in the opposite direction on its pivot by a spring 21 connected at one end at 22 to the rear end of each bracket 17 eccentric to the axis of the comb and at its opposite end at 23 to one of the links 10, 11 here shown as link 11, this spring yieldingly restraining pivotal movement of the comb but allowing the same to yield sufficiently to prevent breakage of the comb when large lumps of fertilizer are being carried by the beater against the comb.

The comb is limited in its movement when it assumes either of its operative positions by a stop 24 supported by the body of the fertilizer distributer and located between the lower ends of the links 10, 11 of each pair, this stop having engaging faces 25, 26 arranged at an angle to each other for engaging respectively opposite edges of the links 10, 11, the face 26 engaging the link 11 when the parts are in their position indicated in full lines, Fig. 2, and the face 25 engaging the link 10 when the parts are in their position indicated in dotted lines, Fig. 2.

The pivots 12, 13 at the lower ends of each pair of links 10, 11 are reinforced in their support by a brace 27 connecting said pivots.

Owing to the arrangement of the links 10, 11 and 16, the angle of the comb remains the same during its movement from one operative position to the other and when the comb is in position to act as an end board, the pivot 15 is arranged slightly above a straight line intersecting the pivots 13, 14 so that the comb is not locked in such position and also is not moved too easily out of such position.

In fertilizer distributers heretofore in use, the end board has been removed and inserted by hand or the beater has been constructed to shift toward the load to act as an end board and from the rear end of the load in order to obtain sufficient clearance to start rotating. By my invention the comb is arranged to move automatically into position to act as an end board and also to move automatically and by a translatory movement into and out of its position near the beater. It will be understood that throughout this specification and claims, the word comb is used merely for convenience and that applicant does not limit himself to the comb shown in the drawing and that any device movable by the movement of the bottom to act as an end board may be employed.

What I claim is:—

1. In a fertilizer distributer, the combination with a body, a movable apron, and a beater, of a rake, freely movable holding and guiding devices therefor arranged to normally support the rake crosswise of the body in front of the beater and yieldingly hold the same against the rear end portion of the load and movable by the pressure of the load on the rake during the rearward movement of the load by the apron to carry the rake into a position above the beater, substantially as and for the purpose described.

2. In a fertilizer distributer, the combination with a body, a movable apron, and a movable beater, of a rake, and freely movable holding and guiding means therefor arranged to press the rake forwardly against the rear end portion of the load and to move rearwardly and upwardly to carry the rake above the beater under pressure of the load when being carried rearwardly by the apron, the rake being pivoted to said means, and said guiding and holding means including a part engaging the rake, and maintaining the rake with its teeth in substantially upright position in all positions of the holding and guiding means, substantially as and for the purpose specified.

3. In a fertilizer distributer, the combination with a body, a movable apron, and a beater, of a rake, a freely movable arm pivoted to the body and pivotally connected to the rake, the arm inclining forwardly and upwardly from the pivot connecting it to the body, and a part carrying the rake and being pivotally connected to the upper end of said arm, means for limiting the movement of the arm in a forward direction before it reaches a horizontal plane and limiting the movement of the arm rearwardly before it reaches a vertical plane whereby said arm is moved rearwardly by the pressure of the traveling load against the rake and forwardly against the load as the pressure on the rake varies.

4. The combination in a manure spreader of a load-carrying body, a rapidly rotated distributing beater for spreading a load upon the ground, a rake, supports for the rake, each comprising two arms pivoted at different points to the rear of the body and extending forward, a link pivoted at its ends to the forward ends of the said arms, a bracket carrying at its rear one end of the said rake, and pivoted at its forward end to the forward end of one of the said arms, and a resilient means for resisting upward movement of the rake-carrying bracket.

5. The combination in a manure spreader of a load-carrying body, a rapidly rotated distributing beater mounted at the rear thereof, a rake, rake supports, each of the said supports comprising two arms pivoted to the body at their rear ends, a link pivotally connecting their forward ends, a bracket carrying an end of the rake at one of its ends and pivoted at the other end to one of the said arms, and an abutment positioned between the pivotal connections of the arms to the body, and serving as a stop to limit the movement of the arms in both directions.

6. In a fertilizer distributer, the combination with a body, a movable bottom, and a device for serving as an end board, of means for supporting said device comprising freely movable links pivoted to opposite sides of the body and inclining upwardly and forwardly from their pivots and connected at their forward ends to opposite ends of said device, and means for limiting the movement of the links forwardly in an inclined position, substantially as and for the purpose set forth.

7. In a fertilizer distributer, the combination with a body, and a movable bottom, of a device for serving as an end board, and means for supporting said device comprising pairs of freely movable links located respectively on opposite sides of the body, the links of each pair being pivoted to said body, and a link connecting the upper ends of the supporting links, said device being pivoted to the supporting means and said supporting means and said device having coacting means to control the pivotal movement of said device during the pivotal movement of the pairs of links, substantially as and for the purpose described.

8. In a fertilizer distributer, the combination with a body having a movable bottom and a rotary beater mounted at the rear end of the body, of a pair of links connected at corresponding ends to the opposite sides of the body in advance of the beater, said links extending upwardly and forwardly, a comb element comprising substantially vertically disposed tines and a part extending forwardly from the upper end portion of the tines substantially at right-angles to the latter, and pivotally mounted at its forward end between the upper ends of said links, an additional link substantially corresponding in effective length to the other links and pivoted at its lower end to one side of the wagon to the rear of and in a higher plane than the pivotal connection of the contiguous link, the additional link extending substantially in parallelism with the contiguous link, a short link connecting the outer end of said contiguous and additional links, stop surfaces coöperating with said links for arresting respectively the rearward movement of the parts before said contiguous link passes beyond a vertical plane intersecting its pivot, and arresting the forward movement of the parts before the pivotal points of the additional link and of said short link with the said contiguous and additional links reach a position in alinement.

9. In a fertilizer distributer, the combination with a body having a movable bottom and a rotary beater mounted at the rear end of the body, of a pair of links connected at corresponding ends to the opposite sides of the body in advance of the beater, said links extending upwardly and forwardly, a comb element comprising substantially vertically disposed tines and a part extending forwardly from the upper end portion of the tines substantially at right-angles to the latter, and pivotally mounted at its forward end between the upper ends of said links, an additional link substantially corresponding in effective length to the other links and pivoted at its lower end to one side of the wagon to the rear of and in a higher plane than the pivotal connection of the contiguous link, the additional link extending substantially in parallelism with the contiguous link, a short link connecting the outer end of said contiguous and additional links, stop surfaces coöperating with said links for arresting respectively the rearward movement of the parts before said contiguous link passes beyond a vertical plane intersecting its pivot, and arresting the forward movement of the parts before the pivotal points of the additional link and of said short link with the said contiguous and additional links reach a position in alinement, and yielding means tending to maintain the part extending forwardly from the tines substantially in parallelism to said short link, substantially as and for the purpose described.

10. In a fertilizer distributer, a body or box, a movable beater, a device serving as an end board and a comb, and means for supporting said device, said means comprising pairs of links located respectively on opposite sides of the body of the fertilizer distributer, the links being pivoted to said body and normally extending upwardly and forwardly from their pivots whereby their upper ends move in a general direction forwardly and rearwardly during the pivotal movement of the links, and a link pivoted to and connecting the upper ends of the supporting links, said device being arranged with the prongs thereof in depending or nearly vertical position, and the links being arranged to maintain the device with its prongs in depending or nearly vertical position during forward and rearward movement of the links, and said device being pivotally connected to its supporting means and having a stop coacting therewith to limit the pivotal movement of said device, substantially as and for the purpose set forth.

11. In a fertilizer distributer, a body or box, a movable beater, a device serving as an end board and a comb, and means for supporting said device, said means comprising pairs of links located respectively on opposite sides of the body of the fertilizer distributer, the links being pivoted to said body and normally extending upwardly and forwardly from their pivots whereby their upper ends move in a general direction forwardly and rearwardly during the pivotal movement of the links, and a link pivoted to and connecting the upper ends of the supporting links, said device being pivotally connected to its supporting means and having a stop for coacting therewith to limit the pivotal movement thereof, said stop coacting with the connecting link, substantially as and for the purpose described.

12. In a fertilizer distributer, a body or box, a movable beater, a device serving as an end board and a comb, and means for supporting said device, said means comprising pairs of links located respectively on opposite sides of the body of the fertilizer distributer, the links being pivoted to said body and normally extending upwardly and forwardly from their pivots whereby their upper ends move in a general direction forwardly and rearwardly during the pivotal movement of the links, a link connecting the upper ends of the supporting links, said device being pivotally connected to its supporting means and having a stop for coacting therewith to limit the pivotal movement thereof, and a spring for normally resisting pivotal movement of said device in one direction relatively to its supporting means, substantially as and for the purpose specified.

13. In a fertilizer distributer, a body or box, a movable beater, a device serving as an end board and a comb, and means for supporting said device, said means comprising pairs of links located respectively on opposite sides of the body of the fertilizer distributer, the links being pivoted to said body and normally extending upwardly and forwardly from their pivots whereby their upper ends move in a general direction forwardly and rearwardly during the pivotal movement of the links, a link pivoted to and connecting the upper ends of the supporting links, said device being pivoted to its supporting means and having a stop coacting with the connecting link, and a spring for holding said device with the stop thereof engaged with the supporting means, substantially as and for the purpose set forth.

14. In a fertilizer distributer, a body or box, a movable bottom, a device for serving as an end board, and means for supporting said device, said means comprising pairs of links located respectively on opposite sides of the body of the fertilizer distributer, the links of each pair being pivoted at their lower ends to said body, and a link connecting the upper ends of the supporting links, the connecting link being pivoted to said device and its pivotal axis being coincident with the axis of the pivot connecting one link of the pair and the connecting link, substantially as and for the purpose specified.

15. In a fertilizer distributer, a body or box, a movable bottom, a device for serving as an end board, and means for supporting said device, said means comprising pairs of links located respectively on opposite sides of the body of the fertilizer distributer, the links of each pair being pivoted at their lower ends to said body, and a link connecting the upper ends of the supporting links, the connecting link being pivoted to said device and its pivotal axis being coincident with the axis of the pivot connecting one link of the pair and the connecting link, a stop carried by said device and engaging the connecting link for limiting the pivotal movement of the device in one direction, and a spring connected to said device and connected to one of the links of the pair for yieldingly restraining pivotal movement of the device in the opposite direction, substantially as and for the purpose set forth.

16. In a fertilizer distributer, a body or box, a movable bottom and beater, a comb, and means for supporting the comb, said means being pivotally connected to the comb and holding the comb in front of the beater in position to act as an end board when the bottom is stationary and being movable during the initial movement of the bottom to carry the comb into position above the beater, said supporting means comprising links pivotally connected at corresponding ends to opposite sides of the body and extending upwardly and forwardly from their pivots, the links being pivotally connected at their upper ends to opposite ends of the comb, the links and the comb being arranged whereby the comb is moved from its forward position by the movement of the load and guided in its movement by said links and is returned by gravity to its forward position when the movable bottom ceases its feeding movement, and means for holding the comb from pivotal movement during the movement of the links, substantially as and for the purpose set forth.

17. In a fertilizer distributer, the combination of a body, a movable bottom, a beater, a comb, and means for supporting the comb, comprising two pairs of freely movable links located respectively on opposite sides of the body and movable forwardly and rearwardly on their pivots and normally inclining forwardly and upwardly from their pivots, and a link connecting the upper ends of each pair of links and pivoted thereto, the comb being pivoted to one link of each pair and having means coacting with the connecting link to hold the comb with its teeth in substantial parallelism in all positions of the comb, and means for limiting the movement of the links in a forward direction before they reach a horizontal plane and for limiting the movement of the links in a rearward direction before they reach a vertical plane, substantially as and for the purpose specified.

18. In a fertilizer distributer, a body or box, a movable bottom and beater, a comb, and means supporting the comb, said means holding the comb in front of the beater in position to act as an end board when the bottom is stationary, and being movable during the initial movement of the bottom to carry the comb into position above the beater, supporting means comprising two pair of links located respectively on opposite sides of the body and connected to opposite ends of the comb, the links of each pair being pivoted at corresponding ends to said body and extending upwardly and forwardly, and a link connecting the upper ends of said pair of links and pivoted thereto, the connecting link being pivoted to the comb by a pivot located coincident with the axis of the pivot connecting one link of each pair and the connecting link, substantially as and for the purpose specified.

19. In a fertilizer distributer, a movable bottom and beater, a comb, means for supporting the comb, said means holding the comb in front of the beater in position to act as an end board when the bottom is stationary and being movable during the initial movement of the bottom to carry the comb into position above the beater, and yielding means connecting the comb and its supporting means, substantially as and for the purpose set forth.

20. In a fertilizer distributer, a movable bottom and beater, a comb, means supporting the comb, said means holding the comb in front of the beater in position to act as an end board when the bottom is stationary and being movable during the initial movement of the bottom to carry the comb into position above the beater, the comb being pivoted to its supporting means, and a spring connected to the comb eccentric to its pivot, the spring being also connected to the supporting means, substantially as and for the purpose described.

21. In a fertilizer distributer, a body or box, a movable bottom and beater, a comb, means supporting the comb, said means holding the comb in front of the beater in position to act as an end board when the bottom is stationary and being movable during the initial movement of the bottom to carry the comb into position above the beater, the supporting means comprising two pair of links located respectively on opposite sides of the body and connected to opposite ends of the comb, the links of each pair being pivoted at corresponding ends to said body and extending upwardly and forwardly, and a link connecting the upper ends of said pair of links and pivoted thereto, the connecting link being connected to the comb, and a spring connecting the comb and one of the links of the pair, substantially as and for the purpose specified.

22. In a fertilizer distributer, a movable bottom and beater, a comb, and means for supporting the comb, said means holding the comb in front of the beater in position to act as an end board when the bottom is stationary and being movable by the load during the initial movement of the bottom to carry the comb into position above the beater, the comb being pivoted to and movable about one axis relatively to its supporting means and being provided with a stop for engaging the supporting means and limiting the pivotal movement of said comb in one direction, substantially as and for the purpose set forth.

23. In a fertilizer distributer, a movable bottom and beater, a comb, means supporting the comb, said means holding the comb in front of the beater in position to act as an end board when the bottom is stationary and being movable during the initial movement of the bottom to carry the comb into position above the beater, the comb being pivoted to its supporting means and being provided with a stop for engaging the supporting means and limiting the pivotal movement of said comb in one direction, and a spring connected to the comb and to the supporting means and tending to hold the stop in engagement with the supporting means, substantially as and for the purpose specified.

24. In a fertilizer distributer, a body or box, a movable bottom and beater, a comb, means supporting the comb, said means holding the comb in front of the beater in position to act as an end board when the bottom is stationary, and being movable during the initial movement of the bottom to carry the comb into position above the beater, supporting means comprising two pair of links located respectively on opposite sides of the body and connected to opposite ends of the comb, the links of each pair being pivoted at corresponding ends to said body and extending upwardly and forwardly, and a link connecting the upper ends of said pair of links and pivoted thereto, the connecting link being pivoted to the comb by a pivot located coincident with the axis of the pivot connecting one link of each pair and the connecting link, a stop on the end of the comb for engaging the last mentioned link, and a spring connected at one end to the comb eccentric to its pivot and at its other end to one of the links of said pair and holding the stop in engagement with the connecting link, substantially as and for the purpose set forth.

25. In a fertilizer distributer, a body or box, a movable bottom and beater, a comb, and means for supporting the comb, said means holding the comb in front of the beater in position to act as an end board when the bottom is stationary and being movable during the initial movement of the bottom to carry the comb into position above the beater, the supporting means comprising two pair of links located respectively on opposite sides of the body of the fertilizer distributer and connected to opposite ends of the comb, the links of each pair being pivoted at corresponding ends to said body and extending upwardly and forwardly, and a link connecting the upper ends of said pair of links and pivoted thereto, the last-mentioned link being connected to the comb, a stop located between the lower ends of the links of each pair and having surfaces arranged at an angle to each other for engaging respectively opposing faces of the links and limiting the movement of said links of each pair when the comb assumes either of its operative positions, substantially as and for the purpose specified.

In testimony whereof, I have hereunto signed my name in the presence of two attesting witnesses, at Syracuse, in the county of Onondaga, in the State of New York, this 3rd day of October, 1910.

FRED GINKEL.

Witnesses:
S. DAVIS,
CHAS. H. YOUNG.